US007415754B1

(12) United States Patent
Cargill et al.

(10) Patent No.: US 7,415,754 B1
(45) Date of Patent: Aug. 26, 2008

(54) TOOL AND A METHOD FOR REMOVING A BEARING FROM A DIFFERENTIAL ASSEMBLY

(76) Inventors: John Earl Cargill, 7859 Carpenter St., Shelby Township, MI (US) 48317-4401; Albert Anthony Travnikar, 641 Briarvale Dr., Auburn Hills, MI (US) 48326-3379; George Stephen McCausland, 1203 N. Point Dr., Kalamazoo, MI (US) 49004-3432

( * ) Notice: Subject to any disclaimer, the term of this patent is extended or adjusted under 35 U.S.C. 154(b) by 131 days.

(21) Appl. No.: 11/184,446

(22) Filed: Jul. 19, 2005

(51) Int. Cl.
*B23P 19/04* (2006.01)

(52) U.S. Cl. ............................ 29/263; 29/271; 29/280; 29/282

(58) Field of Classification Search .................. 29/263, 29/265, 255, 267, 270, 271, 282, 264
See application file for complete search history.

(56) References Cited

U.S. PATENT DOCUMENTS

| | | | | | |
|---|---|---|---|---|---|
| 5,243,749 | A | * | 9/1993 | Shultz | 29/263 |
| 5,687,464 | A | * | 11/1997 | Marshall | 29/263 |
| 5,802,692 | A | * | 9/1998 | Philippe | 29/263 |

* cited by examiner

*Primary Examiner*—Lee D Wilson
(74) *Attorney, Agent, or Firm*—Law Offices of John Chupa & Associates, P.C.

(57) ABSTRACT

A tool 100 which is adapted to efficiently and safely remove a bearing, such as side bearing 40, from an assembly, such as a differential assembly 10. The tool 100 includes a plug 102 which is forcibly inserted through the bearing 40 by a member 140 and the bearing 40 is substantially encapsulated by members 200, 222 and 300, which cooperate with the member 140 and the plug 102 to allow the bearing 40 to removed from the assembly 10.

17 Claims, 4 Drawing Sheets

TOOL AND A METHOD FOR REMOVING A BEARING FROM A DIFFERENTIAL ASSEMBLY

FIELD OF THE INVENTION

The present invention generally relates to a tool and to a method for removing a bearing from a differential assembly and more particularly, to a tool which allows a bearing to be efficiently and safely removed from a differential assembly by a new and novel method and which may be manifested in a kit form in which the tool may be used in combination with diverse types of bearings, differentials, and other non-differential types of assemblies.

BACKGROUND OF THE INVENTION

An automobile differential assembly is typically and operatively coupled to a pair of wheels (e.g., the rear wheels) of the automobile and to the selectively rotatable drive shaft. Particularly, the differential assembly typically includes a pair of opposed side gears and a pair of opposed pinion gears which are each respectively coupled to bearings, and this assembly couples the engine power to the driven wheels, acts as a final gear reduction in the automobile by slowing the rotational speed of the transmission, and transfers the engine power to the driven wheels while allowing them to rotate at different speeds, thereby substantially increasing the likelihood that the driven automobile will remain stable.

Servicing such a differential assembly typically requires the removal of the side and/or pinion bearings and such removal is often complicated, is oftentimes unsafe due to the typical utilized removal strategies (e.g., such as those involving the use of a hammer or other implement which is made to selectively strike the bearings, thereby often splintering the same and typically causing such splinters to “fly” toward the individual removing the bearings and others) and causes damage to the bearing containing assembly.

The present invention overcomes these and other drawbacks associated with current differential bearing removal strategies and techniques and which may be further adapted for use with a wide variety of dissimilar differential and non-differential assemblies and apparatuses.

SUMMARY OF THE INVENTION

It is a first non-limiting object of the present invention to provide a tool which may be used to selectively remove the bearings of a differential or other type of assembly in a manner which overcomes some or all of the drawbacks associated with current and/or prior bearing removal strategies and techniques.

It is a second non-limiting object of the present invention to provide a method for removing a bearing of a differential or other type of assembly which overcomes some or all of the drawbacks associated with current and/or prior bearing removal strategies and techniques.

It is a third non-limiting object of the present invention to provide a kit which allows bearings to be selectively removed in an efficient and relatively safe manner from a wide variety of dissimilar apparatuses.

According to a first non-limiting aspect of the present invention, a tool is provided and includes a plug having a diameter which is slightly smaller than the diameter of a bearing; a body portion which is adapted to selectively receive the plug when the plug is inserted through the bearing; a first clamshell member which receives a portion of the bearing and which is operatively engages the body; a second clamshell member which receives a second portion of the bearing, which engages the first clamshell member, and which operatively engages the body; and a retaining ring member which substantially encapsulates the first and second clamshell members, thereby allowing the bearing to be selectively removed from an object.

According to a second non-limiting aspect of the present invention, a tool is provided and includes a plug member having a generally elongated insert portion; a generally hollow body portion a first open end which selectively receives the generally elongated insert portion, the generally hollow body having a second threaded end and including a portion which is movably received in the second threaded end, thereby allowing the portion to be selectively moved within the generally hollow body portion and against the received elongated insert portion and wherein the generally hollow body portion has an exterior surface which includes a second threaded portion; a pair of substantially identical adjustment rings which are movably and stackably disposed on the second threaded portion; first and second clamshell members which cooperatively and substantially encapsulate the pair of substantially identical adjustment rings and selectively and circumferentially engage a bearing which is operatively disposed within a differential assembly; and a retainer portion which selectively and substantially encapsulates the pair of substantially identical adjustment rings and which cooperates with the insert portion, with the body portion, and with the pair of substantially identical clamshell members to allow the bearing to be selectively removed from the differential assembly According to a third non-limiting aspect of the present invention, a tool is provided and includes a plug member having a generally elongated and tapered and solid insert portion; a generally hollow body portion a first open end which selectively receives the insert portion, the generally hollow body having a second threaded end and including a portion which is movably received in the second threaded end, thereby allowing the portion to be selectively moved within the generally hollow body portion and against the received insert portion and wherein the generally hollow body portion has an exterior surface which includes a second threaded portion; a pair of substantially identical adjustment rings which are movably and stackably disposed on the second threaded portion; first and second clamshell members which cooperatively and substantially encapsulate the pair of substantially identical adjustment rings and selectively and circumferentially engage a bearing which is operatively disposed within a differential assembly and wherein the pair of first and second clamshell members have an adjustable diameter; and a retainer portion which selectively and substantially encapsulates the pair of substantially identical adjustment rings and which cooperates with the insert portion, with the body portion, and with the pair of substantially identical clamshell members to allow the bearing to be selectively removed from the differential assembly.

According to a fourth non-limiting aspect of the present invention, a kit for removing a bearing from a differential assembly is provided and includes a generally hollow elongated portion having an exterior threaded portion; an insert member which is adapted to be selectively placed into the generally hollow elongated portion and to thereafter selectively and receivable engage the bearing; a plurality of pairs of rings wherein each of the pairs of rings have a unique diameter and wherein each of the pairs of rings being adapted to be selectively and respectively and threadably disposed upon the exterior threaded portion of the generally hollow elongated portion; a plurality of pairs of clamshell members wherein each of the pairs of clamshell members being respectively adapted to be selectively placed upon a unique one of the pairs of rings and to engage the bearing; and ring member having an adjustable diameter and adapted to be selectively placed upon each pair of the rings when each of the pair of the rings is selectively placed upon the exterior threaded portion.

According to a fifth non-limiting aspect of the present invention, a method for removing a bearing from a differential assembly is provided and includes the steps of substantially encapsulating a portion of the bearing; and pulling the bearing from the differential assembly.

These and other features, aspects, and advantages of the present invention will become apparent from a reading of the following detailed description of the preferred embodiment of the invention, including the subjoined claims, and by reference to the following drawings.

DETAILED DESCRIPTION OF THE PREFERRED EMBODIMENT OF THE INVENTION

Figure 1:
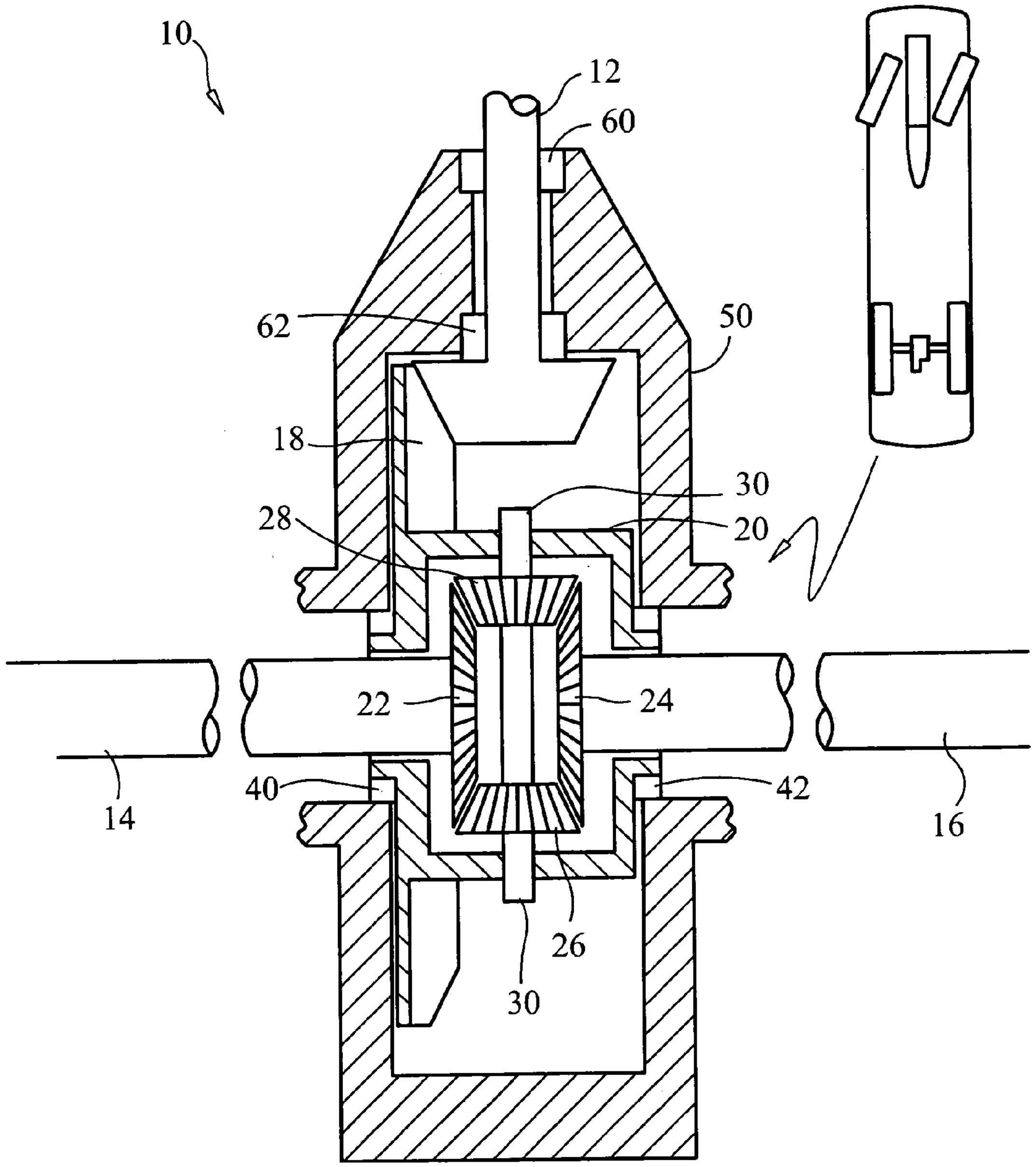
FIG. 1 is a schematic diagram of a conventional automotive differential assembly having bearings which may be removed in accordance with the teachings of the present invention.

Referring now to FIG. 1, there is shown a conventional differential assembly 10 which may be selectively used within an automobile or other type of selectively powered and driven apparatus. It should be appreciated that differential assembly 10 is only one type of differential assembly which may have its bearings removed by the present invention and that the present invention is not limited to use with any particular type of differential assembly. Further, as will be appreciated from the foregoing discussion, the present invention may be selectively used with substantially any bearing containing assembly.

As shown in FIG. 1, the differential assembly 10 receives a selectively rotatable or "driven" member (e.g., a drive pinion shaft assembly) 12 (such as a member which is selectively coupled to and driven by any type of engine or energy producing assembly) and that the differential assembly further receives axles 14, 16 which are selectively and operatively coupled to driven wheels (not shown). It should be understood that the pinion drive shaft assembly 12 includes a pinion drive gear.

Particularly, the differential assembly 10 includes a ring gear 18 and a differential cage 20. That is, the ring gear 18 is coupled to the pinion drive shaft assembly 12 and is further coupled to a differential cage 20. The differential assembly 10 includes a pair of side gears 22, 24 which are contained in the differential cage 20 and a pair of pinion gears 26, 28 which are each coupled to the pair of side gears 22, 24 and which are each mounted within the differential cage 20 on shaft 30, which respectively traverses the differential cage and the side gears 22, 24. Further, the axles 14, 16 are respectively coupled to the side gears 22, 24 and respectively traverse bearings 40, 42 which are affixed to the body 50 of the differential assembly 10. The body 50 operatively contains the ring gear 18 and differential cage 20 and receives the member 12, and the axles 14, 16. Moreover, the drive pinion shaft 12 respectively traverses bearings 60, 62 which are operatively mounted upon the body 50. The bearings 40, 42 are conventionally referred to as "side bearings" and the bearings 60, 62 are conventionally referred to as "pinion bearings". In some differential embodiments, only one pinion bearing is used and, still other embodiments of differential assemblies have additional changes and modifications from that which is shown in FIG. 1, but with which the present invention may be easily utilized. It should be further realized that the present invention may additionally be used with substantially any bearing-containing assembly. In this manner, as should be appreciated by one of ordinary skill in the art, the differential cage 20 rotates in response to movement of the member 12 and the movement of member 12 and the differential cage 20 causes the pinion gears 26, 28 to selectively move the side gears 22, 24 to achieve the previously described objectives in a known and conventional manner.

Figure 2:
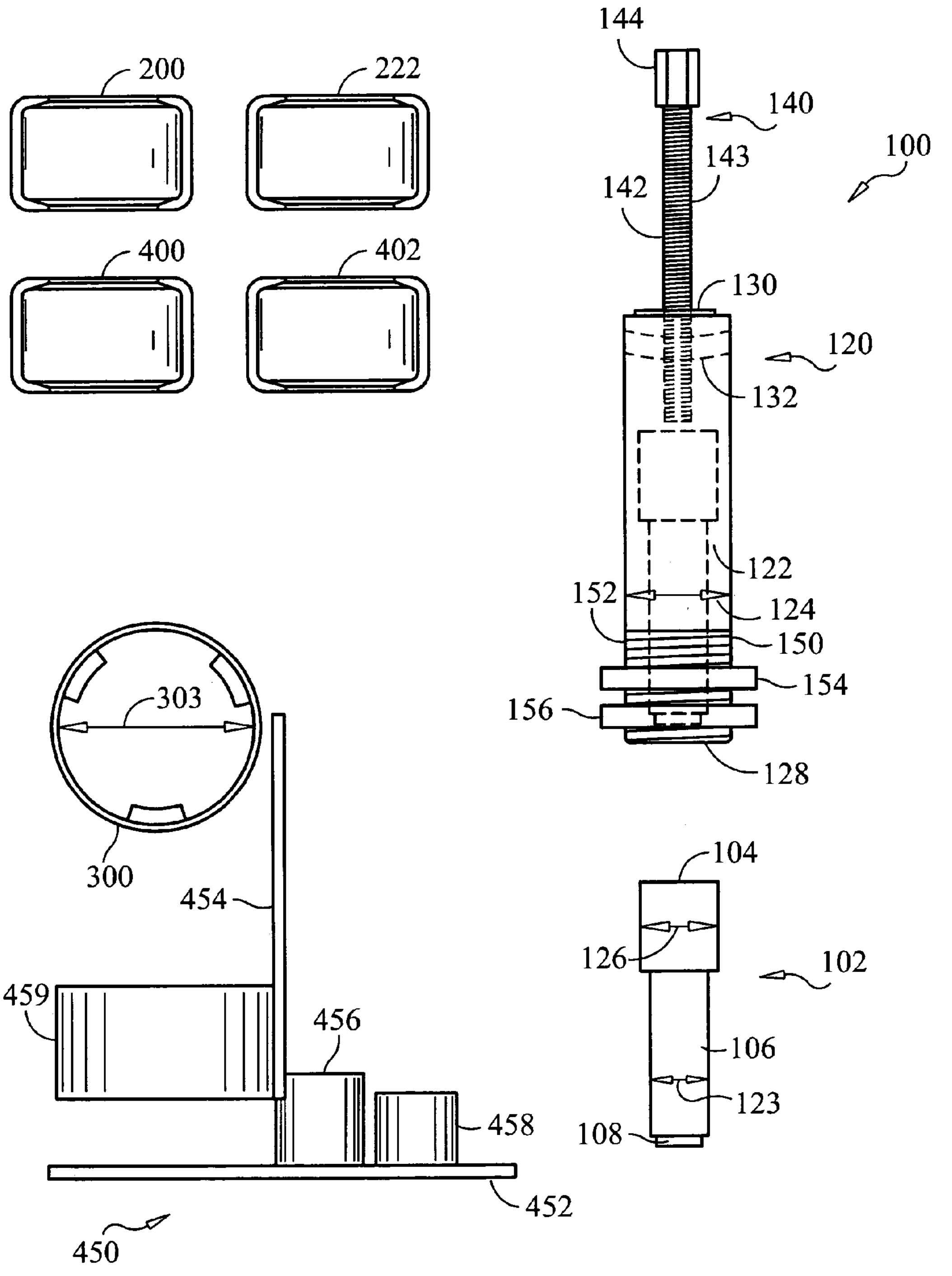
FIG. 2 is a perspective view of a bearing removal kit which is made in accordance with the teachings of the preferred embodiment of the invention.

Referring now to FIG. 2, there is shown a bearing removal kit 100 which is made in accordance with the teachings of the preferred embodiment of the invention. Particularly, the kit 100 includes a generally solid plug portion or member 102 having a varying generally cylindrical or "tapered" cross sectional area including a relatively wide top portion 104, an elongated thinner middleportion 106, and a generally circular and even more thinner end portion or "insertion" portion 108. Particularly, the respective diameter 123, 126 of the portions 104, 106 is slightly smaller than the inner diameter 5 of a bearing, such as bearings 40, 42, 60, 62 (i.e., the respective diameter 123, 126 of the portions 104, 106 is slightly smaller than respective diameter of the "race" or open interior portion 800 of these bearings 40, 42, 60, 62). The kit 100 further includes a generally hollow body member 120 having a generally hollow internal cavity 122 which has a diameter 124 which is slightly larger than the diameter 126 of the portion 104 of the plug member 102.

Further, the body member 120 includes a first open end 128 and a second open end 130, and the second open end 130 has several internal threads 132 which are resident within and are circumferentially disposed within/around the internal cavity 122. Moreover, the kit 100 includes a generally elongated insertion member 140 having a plurality of exterior positioned threads 142 which are circumferentially disposed upon and/or around a body portion 143, and a faceted and wider handle portion 144. Particularly, as best shown in FIG. 2, the threads 142 are complementary to the threads 132, thereby allowing the body portion 143 to be threadably inserted through top portion of the body 120 and against the top portion 104 of the plug member 102 which resides within the interior cavity 122 of the body 120 in order to allow a bearing to removed from an assembly, such as a differential assembly, in a manner which is more fully discussed below. Thus, in one non-limiting embodiment, the diameter of the internal cavity 122 varies from diameter 124, where the plug 102 resides, to a smaller diameter 125 where the member 140 resides and wherein the diameter 125 is slightly larger than the diameter 127 of the body 143. In yet another non-limiting embodiment, the member 140 is integrally formed with the body 120 and is not selectively removable from the body 120. In yet another non-limiting embodiment, member 140 is dispensed with (i.e., not used) and the plug member 102 substantially fills the internal cavity 122. Further, as best shown in FIG. 2, the lower exterior surface 150 of the body 120 (e.g., the portion of the exterior surface of the body 120 remote from the handle 144) includes exteriorly and circumferentially positioned threads 152 and a pair of retaining rings 154, 156 which respectively have complementary threads to the threads 152, thereby being selectively and movably disposed upon the threads 152 and upon the exterior surface portion 150 of the body 120.

Figure 6:
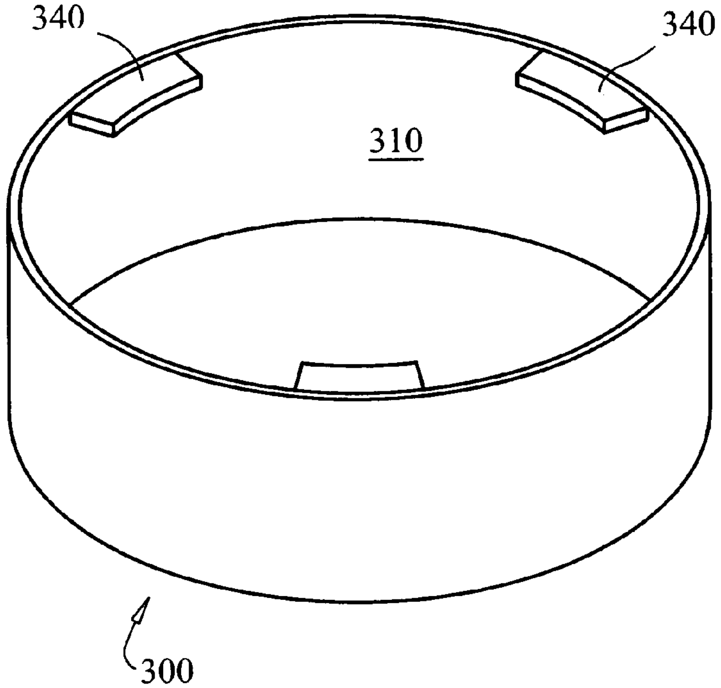
FIG. 6 is an enlarged perspective view of the ring member which is shown in FIG. 2.

The kit 100 further includes at least a pair of substantially identical and generally semi-circular clamshell members 200, 222, each having a respective tapered interior engagement surface 250, 260 (e.g., each forming an angle 3 of about forty-five degrees). The kit 100 further includes a ring member 300 having a diameter 303 which is slightly larger than the diameter 305 of each of the clamshell members 200, 222 when they are operatively combined. As is best shown in FIG. 6, in the preferred embodiment of the invention, ring member 300 includes a plurality of tab members which are deployed on or formed within the inner surface 310 of member 300. In an alternate embodiment of the invention, different sizes of clamshell members, such as members 400, 402, may be placed within the kit 100 in order to facilitate the removal of various uniquely sized bearings and the diameter of the member 300 may be selectively adjustable such as by allowing member 300 to be selectively expanded and contracted, such as by forming member 300 by use of telescoping plates. Alternatively, different sized members 300, having respective and unique diameters, may be provided in the kit 100.

The kit 100 also includes a stand member 450 having a base 452 and a handle projection member 454 which is adapted to be held in the hand of a user and to allow the stand member 450 to be selectively and easily transported by the user. Further, the stand member 450 includes a first hollow and generally cylindrically shaped receptacle 458, disposed upon the base portion 452, which selectively receives at least some of the portion 106 of the plug member 102, and a second hollow and generally cylindrically shaped receptacle 456 which is adapted to selectively receive the member 140 (if such a removable member is utilized). The open end 128 of the body member 120 may then selectively receive the member 102 which is disposed within the receptacle 458. The stand member 450 also includes a third hollow and generally cylindrical receptacle member 459 which is attached to the projection member 454 and which is adapted to selectively receive the members 200, 222 (and other clamshell members, such as members 400, 402, which may be stacked on the contained members 200, 222). The member 300 may be placed through the handle member 454. In this manner, the stand 450 allows the kit 100 to be securely stored in a disassembled manner and easily transported.

Figure 5:
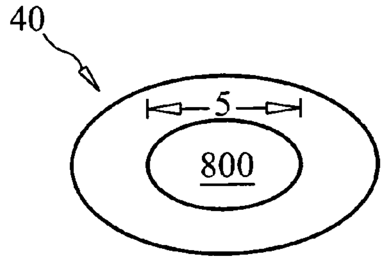
FIG. 5 is a top view of a bearing which is shown in FIG. 1.

In operation, the bottom portion 108 of the member 102 is inserted through the "race" or open central portion of a bearing, such as opening 800 of side bearing 40 (see FIG. 5). The following discussion describes the removal of side bearing 40. However, it should be appreciated that this discussion may be equally applicable and descriptive to the removal of substantially any other bearing from substantially any assembly, including but not limited to a differential assembly (e.g., before the pinion bearing 62 is removed, the body 50 must be opened). It should further be appreciated that either end 104, 108 of the plug 102 may be used based upon the size of the bearing to be removed, and that the plug 102 may be made in substantially any desired proportions.

Figure 3:
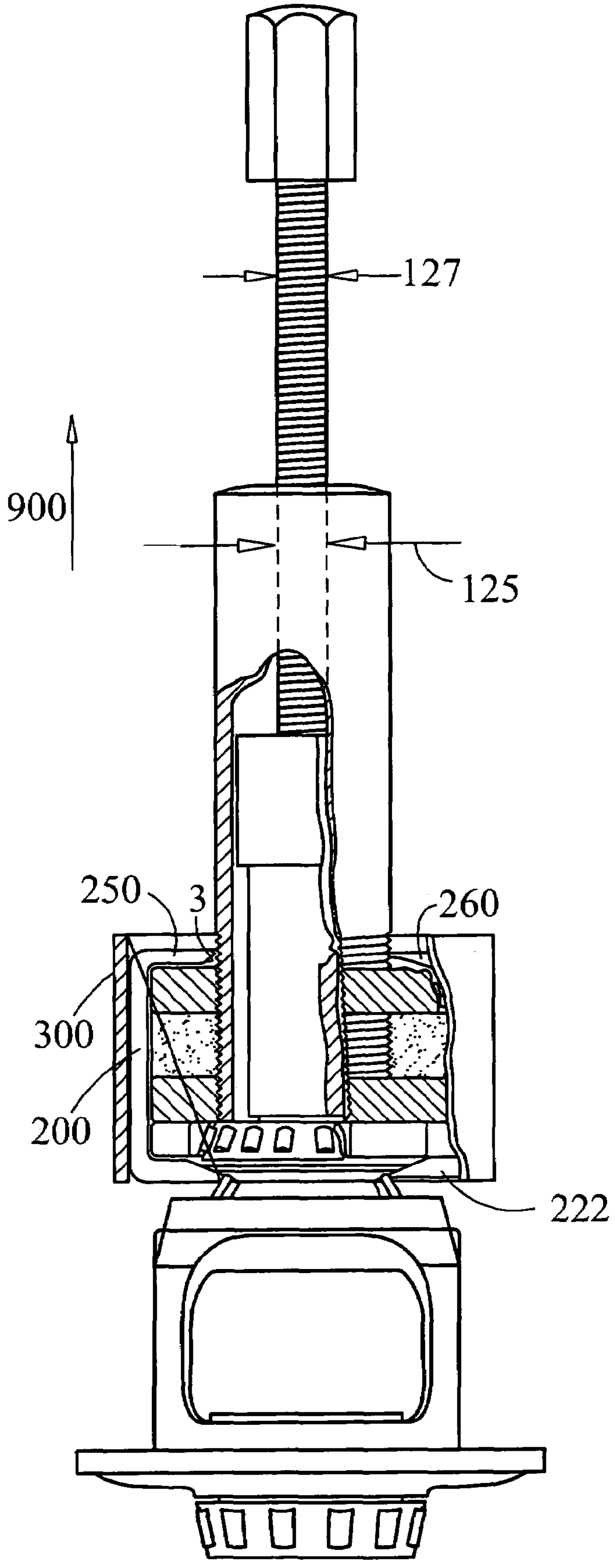
FIG. 3 is a partial cut-away view of a tool which is made in accordance with the teachings of the preferred embodiment of the invention shown in assembled relation with a typical differential assembly.
Figure 4:
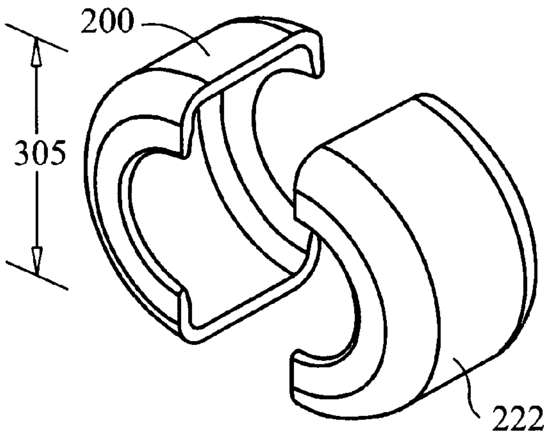
FIG. 4 is a perspective view of the clamshell members which are shown in FIGS. 2 and 3.

Once the bottom portion 108 is inserted into the open center portion 800 of the bearing 40, the interior cavity 122 of the body member 120 is made to receive the member 104. The clamshell members 200, 222 then are made to cooperatively and substantially encapsulate the bearing 40 (best shown in FIG. 3) with the tapered surfaces 250, 260 contacting the substantially encapsulated bearing 40. Then the ring member 300 is made to substantially encapsulate the operatively positioned clamshell members 200, 222.

The faceted end 144 is then turned until the body 140 engages the contained plug member 102, thereby forcing the plug member 102 against the cage 20 containing the bearing 40 (if portion 140 is used). The bearing 40 may then be subsequently pulled from the cage 20 by the use of an upwards (in the direction of arrow 900) force applied on member 140 or body 120 in an efficient and safe manner, since the bearing 40 is substantially encapsulated by the ring member 300 and therefore the likelihood of splinters of the bearing 40 "flying through the air" is substantially reduced and/or eliminated. It should be appreciated that although the clamshell members 200, 222 are pulled upward (i.e., in the direction of arrow 900) when force is applied, the tab members 340 of the ring member 300 selectively hold the clamshell members 200, 222 in place around the bearing 40. Further, it should be appreciated that the tapered surfaces 250, 260 increase, by leverage, the removal force actually applied to the bearing 40 by the upward pulling of member 140 and/or body 120 and the clamshell members 200, 222, member 300, and rings 154, 156 allow the upward force to be efficiently transmitted to the bearing 40. In one non-limiting embodiment, surfaces 250, 260 are planar.

It is to be understood that the invention is not limited to the exact construction or methodology which has been described above, but that various changes and modifications may be made without departing from the spirit and the scope of the inventions as are further delineated in the following claims.

The invention claimed is:

1. A tool for removing a bearing comprising a plug having a generally cylindrical cross-sectional area and wherein said plug having a diameter which is slightly smaller than the inner diameter of a bearing; a body portion having an internal cavity wherein said internal cavity having threads which are resident within and circumferentially disposed within said internal cavity, and wherein said body portion including an insert portion having an insertion member body portion having a plurality of exterior positioned threads which are circumferentially disposed upon said insertion member body portion and wherein said insert portion is threadably coupled to said threads of said body portion and wherein said body portion is adapted to selectively receive said plug when said plug is inserted through said bearing; a first clamshell member having a tapered interior engagement surface and wherein said first clamshell member receives a portion of said bearing and which is operatively engages said body; a second clamshell member having a tapered interior engagement surface and wherein said second clamshell member receives a second portion of said bearing, which engages said first clamshell member, and which operatively engages said body; and a retaining ring member having a plurality of tab members adapted to selectively prevent removal of said ring member and wherein said retaining ring member substantially encapsulates said first and second clamshell members, thereby allowing said bearing to be selectively removed from a differential.

2. The tool of claim 1 wherein said first and second clamshell members are substantially identical.

3. A tool for removing a bearing comprising a plug member having a generally elongated plug portion; a generally hollow body portion having an internal cavity and wherein said hollow body portion having a first open end which selectively receives said generally elongated plug portion, and wherein said generally hollow body portion having a second threaded end which are resident within and are circumferentially disposed within said internal cavity and including an insert portion having an insertion member body portion having a plurality of exterior positioned threads which are circumferentially disposed upon said insertion member body portion and wherein said insert portion is threadably coupled to said second threaded end of said hollow body portion, thereby allowing said plug portion to be selectively moved within said generally hollow body portion and against said received elongated insert portion and wherein said generally hollow body portion has an exterior surface which includes a second threaded portion; a pair of substantially identical adjustment rings which are threadably and stackably disposed on said second threaded portion; first and second clamshell members which cooperatively and substantially encapsulate said pair of substantially identical adjustment rings and selectively and circumferentially engage a bearing which is operatively disposed within a differential assembly; and a retainer portion which selectively and substantially encapsulates said pair of substantially identical adjustment rings and which cooperates with said insert portion, with said body portion, and with said pair of substantially identical clamshell members to allow said bearing to be selectively removed from said differential assembly.

4. The tool of claim 3 wherein said first clamshell member includes a certain surface which engages said bearing and wherein said certain surface is tapered.

5. The tool of claim 4 wherein said first clamshell member includes a certain second surface which engages only one of said pair of substantially identical adjustment rings and wherein said certain second surface is tapered.

6. The tool of claim 5 wherein said certain second surface is substantially identical to said certain surface.

7. The tool of claim 4 wherein said first clamshell member includes a certain second surface which engages only one of said pair of substantially identical adjustment rings and wherein said second surface is substantially planar.

8. The tool of claim 3 wherein said first clamshell member includes a certain surface which engages said bearing and wherein said certain surface is substantially planar.

9. A tool comprising a plug member having a generally elongated and tapered and solid insert portion; a generally hollow body portion having a first open end which selectively receives said insert portion, and wherein said generally hollow body having a second threaded end and including a insertion member portion having a plurality of exterior positioned threads which are circumferentially disposed upon said insertion member portion and which is movably received in said second threaded end, thereby allowing said insertion member portion to be selectively moved within said generally hollow body portion and against said received insert portion and wherein said generally hollow body portion has an exterior surface which includes a second threaded portion; a pair of substantially identical adjustment rings which are movably and stackably disposed on said second threaded portion; first and second clamshell members which cooperatively and substantially encapsulate said pair of substantially identical adjustment rings and selectively and circumferentially engage a bearing which is operatively disposed within a differential assembly and wherein said pair of first and second clamshell members have an adjustable diameter; and a retainer portion which selectively and substantially encapsulates said pair of substantially identical adjustment rings and which cooperates with said insert portion, with said body portion, and with said pair of substantially identical clamshell members to allow said bearing to be selectively removed from said differential assembly.

10. The tool of claim 9 wherein said first clamshell member includes a certain surface which engages said bearing and wherein said certain surface is tapered.

11. The tool of claim 10 wherein said first clamshell member includes a certain second surface which engages only one of said pair of substantially identical adjustment rings and wherein said certain second surface is tapered.

12. The tool of claim 10 wherein said certain second surface is substantially identical to said certain surface.

13. The tool of claim 9 wherein said first clamshell member includes a certain surface which engages said bearing and wherein said certain surface is substantially planar.

14. The tool of claim 9 wherein said first clamshell member includes a certain second surface which engages only one of said pair of substantially identical adjustment rings and wherein said second surface is substantially planar.

15. A kit for removing a bearing from a differential assembly, said kit comprising a generally hollow elongated portion having an exterior threaded portion and an circumferentially disposed internally threaded portion; an insert member which is adapted to be selectively placed into said generally hollow elongated portion and to thereafter selectively and receivably engage said bearing; a generally elongated insertion member having a plurality of exterior positioned threads; a plurality of pairs of rings wherein each of said pairs of rings have a unique diameter and wherein each of said pairs of rings being adapted to be selectively and respectively and threadably disposed upon said exterior threaded portion of said generally hollow elongated portion; a plurality of pairs of clamshell members wherein each of said pairs of clamshell members being respectively adapted to be selectively placed upon a unique one of said pairs of rings and to engage said bearing; and ring member having an adjustable diameter and adapted to be selectively placed upon each pair of said rings when each of said pair of said rings is selectively placed upon said exterior threaded portion.

16. The kit of claim 15 wherein said bearing comprises a side bearing.

17. The kit of claim 16 wherein said bearing comprises a pinion bearing.

* * * * *